United States Patent [19]

Ekhoff et al.

[11] Patent Number: 5,018,029
[45] Date of Patent: May 21, 1991

[54] SHOCK START FOR MEMORY DISK MOTOR DRIVES

[76] Inventors: Donald L. Ekhoff, 2600 Day Rd., Gilroy, Calif. 95020; Robert S. Smith, 1263 Emory St., San Jose, Calif. 95126

[21] Appl. No.: 370,606
[22] Filed: Jun. 23, 1989
[51] Int. Cl.⁵ .......................... G11B 5/40; G11B 17/02
[52] U.S. Cl. ........................................ 360/69; 360/71; 360/75
[58] Field of Search ...................... 360/71, 75, 103, 69

[56] References Cited

U.S. PATENT DOCUMENTS

| | | | |
|---|---|---|---|
| 4,530,021 | 7/1985 | Cameron | 360/103 |
| 4,542,429 | 9/1985 | Nishida et al. | 360/75 |
| 4,833,550 | 5/1989 | Takizawa et al. | 360/75 |
| 4,839,754 | 6/1989 | Gami et al. | 360/71 |
| 4,897,743 | 1/1990 | Kohno | 360/75 |
| 4,907,106 | 3/1990 | Yamada | 360/75 |

Primary Examiner—Robert S. Tupper
Attorney, Agent, or Firm—Robert Samuel Smith

[57] ABSTRACT

A method and apparatus for starting mechanisms such as memory disk and head arrays driven by driving mechanisms such as motors that are initially immobilized by constraints such as stiction in disk drives wherein the system is perturbed by a succession of mechanical shocks while a moderate driving force is applied thereby degrading the strength of the restraint to a value where a moderate driving force can drive the mechanism indicating that the restraint has been overcome then increasing the driving force to a full operating value. In one embodiment, the shock is provided by a loaded spring; in another embodiment, the shock is provided by a solenoid; in another embodiment, the shock is provided by a voice coil.

7 Claims, 1 Drawing Sheet

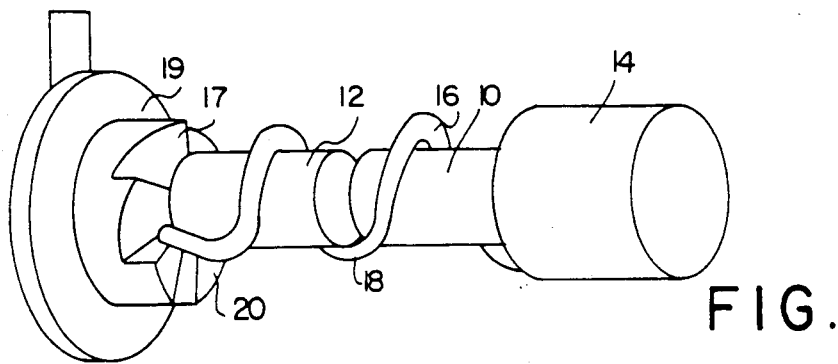
FIG. 1
FIG. 2
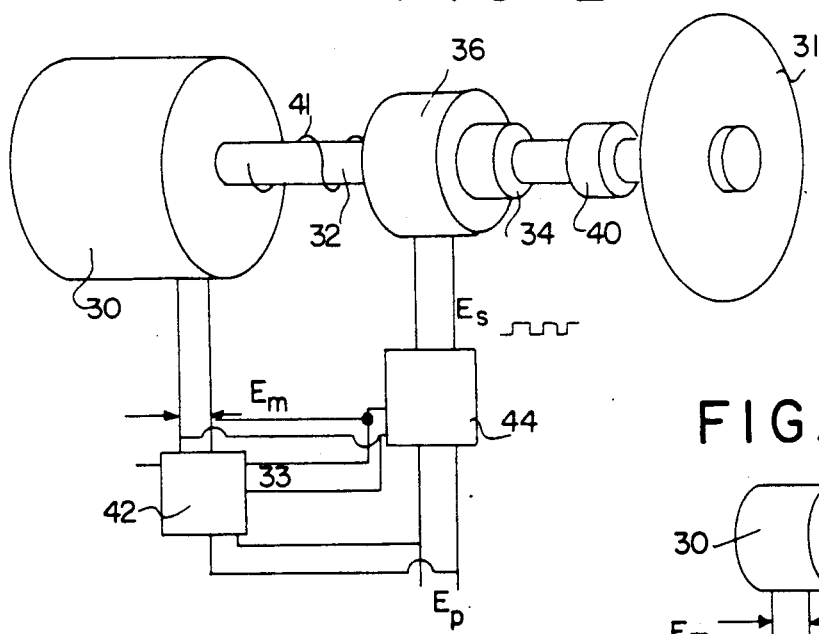
FIG. 4
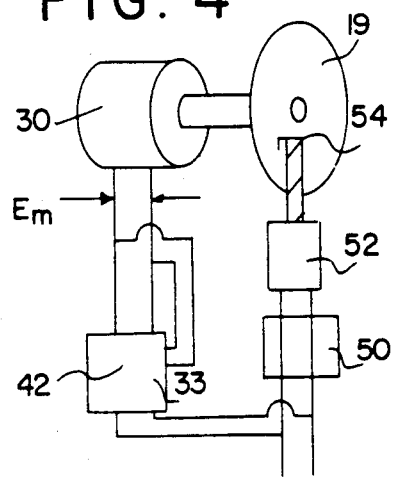
FIG. 3
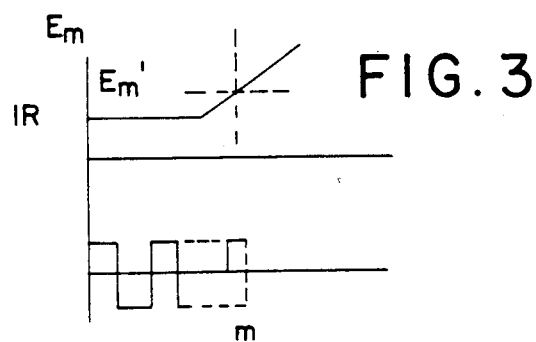

SHOCK START FOR MEMORY DISK MOTOR DRIVES

BACKGROUND

1. Field of the Invention

This invention relates to protection of motors and mechanisms driven by motors and particularly to memory disk files where excessive torque is required by the motor to start the disk turning due to seizure of the disk by the transducer after prolonged periods of resting contact of the head (transducer) with the disk surface.

2. Prior Art

Numerous difficulties can result when a motor is coupled to a mechanism that is prevented from turning when power is applied to the motor. These difficulties can include a blown fuse, overheated motor windings, damaged mechanism, etc.

The problem is well known in memory disk technology where a phenomenon known as "stiction" has plagued the operation of disk drives for many years. Stiction is the term applied to the sticking of heads (transducers) to disk surfaces when the disk is at rest. When the disk motor is turned on, stiction resists the turning of the disk until the disk is broken free from the transducer.

Stiction is thought to arise from several mechanisms. Most all surfaces have an afinity for one another but a layer of absorbed gas on two adjacent faces normally prevents them from sticking together. However, if the surfaces conform very closely to one another and are forced into intimate contact over a period of time, the absorbed air is forced out of the interface so that the surfaces will eventually stick to one another. This mechanism for sticking is called the JO-BLOCK effect.

Another mechanism for generating stiction is linking on a molecular level of a lubricant between two mating faces when the faces are stationary with respect to one another.

In the most severe case of stiction, the flexures and gimballs supporting the heads have been damaged on startup. Consequently, anticipation of stiction has dictated that the starting torque capability of motors be normally two or more times greater than required to simply keep the disk turning. In addition, greater strength is normally designed into the transducer support structure. These remedies require increased expense and more space.

In the earlier days of disk file development, the approach to disk file design that avoided the problem of stiction was to load the heads onto the moving disk surface after the disks started turning. (See U.S. Pat. No. 3,855,622 to Truscelli and Provanik.) However, with growing interest in personal computers leading to an effort to reduce the cost of the disk file, the practice was adopted of leaving the head in contact with the disk surface when the file was not in use.

The problem with stiction in memory disks became especially severe with the introduction of lubricated disk surfaces which was done in order to avoid the problem of damage to the head and disk resulting from intermittent contact between the head and disk when the disk got up to speed.

Another factor that has increased the severity of the stiction problem has been that the demand for greater information storage density has required smoother disk and head surfaces thereby increasing the JO-BLOCK effect.

One approach to disrupting the adhesive stiction force was disclosed in U.S. Pat. No. 4,530,021 to Cameron. According to this technique, a short oscillatory force is imposed on the head prior to starting rotation of the disk. This is accomplished by sending a pulsing current through the voice coil to an accutator that is normally used to move the head from track to track. The force due to the micromotion is transmitted through the gimbals that support the head and disrupts the stiction force. However, in using this technique, the required force may be so large that damage to the gimballs may occur. The uncertain magnitude of the force required to disrupt stiction makes it difficult to predict how sturdy the head support structure must be in order to withstand a mechanical shock imposed to overcome the force of stiction.

THE INVENTION

Objects

It is an object of this invention to overcome restraints that otherwise immobilize a system comprising a driven and driving mechanism by imposing a perturbing force on the system, testing to determine if the restraint has been removed, then repeating these two steps until the restraint has been removed.

It is a further object that perturbing means for imposing said force be operative independent of the initial magnitude of the restraint.

It is another object of this invention that full operating power of the driving mechanism not be applied until after said restraints have been overcome in order to protect the driven mechanism.

These objects are adopted in recognition of the fact that the strength of the adhesive force of stiction increases with the length of time of resting contact so that it is not certain how great the force of stiction will eventually become.

Another object is that the perturbing means be operative despite a limited available torque of the driving means.

Still another object is that the perturbing means be operative within a limit of stress that will not damage the driving mechanism.

It is another object that the driving mechanism be the disk and head array of a memory disk drive and the driving means be the motor of the disk drive and the restraint is the force of stiction between the the head and disk when the disk is in resting contact with the head.

SUMMARY OF THE INVENTION

This invention is directed toward overcoming restraint to startup of a mechanism having a driven section and a driving section by applying a perturbation to the mechanism then testing to determine if the restraint has been overcome and repeating these two steps until the restraint is overcome. Application of this invention is particularly focussed on an array of memory disks and heads where the restraints to startup are stiction forces.

The principle of operation of the perturbing means is based on the observation that the strength of stiction can be reduced with each one of a number of mechanical perturbations applied to the head-disk mechanism. Therefore, a number of such disruptive perturbations is imposed sufficient to reduce the strength of stiction to a value wherein the torque of the motor can overcome the stiction force and rotate the disk array.

An additional principle of operation is that moderate torque is applied between each perturbation as a test to determine if the stiction has been overcome in order to discontinue the perturbations and apply full power.

The force of each perturbation does not exceed a value dictated by the design of the rotating mechanism. In addition, the starting torque exerted by the motor may be specified to have a value that approaches running torque so that a smaller motor may be used. The resultant reduction of space required for the motor and disk support system is an important advantage for disk drives.

A number of constructions embody the principles set forth in the preceding paragraphs all of which are within the scope of this invention. Three of these constructions are described in the following paragraphs.

According to one construction, the shaft of a rotating mechanism (e.g., disks supported on a shaft) is concentric with the shaft of a drive motor. The motor shaft is attached to one end of a spring concentric with the shaft so that the spring rotates as the shaft rotates. The end loop on the other end of the spring adjacent to the disk shaft is in sliding contact with a wheel having radial ridges and is fixed coaxially to the disk shaft. If the disk shaft is frozen due to stiction then the end loop of the spring will slide on the ridges and snap against each ridge in succession as the end of the end loop slides off each ridge thereby sending shock waves through the disk shaft and "perturbing" the restraint (source of stiction). The stiction restraint is reduced successively until it is completely disrupted. After stiction has been overcome, the end of the spring will maintain nonsliding contact with the wheel and the two shafts will be effectively coupled so that the disks will rotate. The disruptive blow to the wheel by the spring will never be greater than a value determined by the maximum compression of the spring. The strength of the contact between the surface of the spring at the end of the loop and the ridge depends on the slope of the ridge and of the spring and the coefficient of friction between ridge and spring. The strength of this contact must be sufficient to not be disrupted by the torque exerted by the motor.

A second construction that is within the scope of this invention employs a hammer activated by a solenoid that applies blows to the disk shaft until a signal indicates that the disk is free.

The signal may be from any one of a number of sources indicating that the restraint has been removed. For example, when the motor current from a constant current source is turned on, the voltage across the motor leads will not exceed the constant motor current multiplied by the resistandce of the windings. This low voltage signals an alternating current supply to activate the solenoid so that blows are administered by the core of the solenoid to the disk shaft and thereby sends a shock wave to disrupt the force of stiction. When stiction is disrupted and the motor starts to turn, the voltage across the motor leads will increase and this voltage signal interrupts current flow to the solenoid so that perturbation ceases.

A third embodiment applies an indefinite series of Perturbations by applying current pulses to the head actuator while simultaneously testing presence of stiction. After stiction is disrupted, motor current is increased to normal operating level.

In contrast, the Cameron Patent discloses applying an alternating current to the voice coil actuator of the head support system in order to induce micromotion in the head that will disrupt the stiction forces. The disruptive signal is applied for a fixed period during which the motor drive current is turned on. Therefore there is no assurance that the stiction forces have been disrupted and that the head support suppoprt system will not be damaged when the disk motor is turned on. In accordance with the present invention and contrary to the Cameron patent, an alternating current is applied to the voice coil until it is determined that the stiction forces have been disrupted so that the head support system will not be damaged when the full operating current of the motor is turned on. At that instant, current to the drive motor is increased to full operating value.

A determination of disruption of stiction forces can be made by a probe that measures displacement of the head. Another method is to measure change of the voice coil impedance or change of current that occurs when the head suddenly breaks free.

This improvement of the Cameron invention prevents damage to the head support structure that otherwise might occur if the stiction forces are not sufficiently disrupted before application of operating current to the disk motor.

It will be understood that the technique of using change of voltage across the motor leads as a signal to increase current to an operating value is applicable in all three of the embodiments discussed. An alternative method to the detection of voltage changes is to apply a constant voltage to the motor leads, monitor the changes in motor current when stiction is overcome, then increase power applied to the motor to the full operating value.

THE DRAWINGS

FIG. 1 shows a construction for disrupting stiction by a spring coupling means between the motor shaft and the disk shaft.

FIG. 2 shows a construction for disrupting stiction by a solenoid means.

FIG. 3 shows a voltage current relationship for implementing the embodiments of FIG. 2 and 4.

FIG. 4 shows a construction for disrupting stiction by a voice coil means.

DESCRIPTION OF A PREFERRED EMBODIMENT

Turning now to a detailed discusssion of the drawings, there is shown in FIG. 1 a mechanical means of administering low intensity perturbations to a recording disk 19 immobilized by stiction until the stiction forces are overcome and the rotating motor shaft "locks on" to the driven shaft 12 causing it to turn. There is shown the motor 14 and the motor shaft 10 which is attached to one end of the spring. Wen the motor shaft and spring turn and stiction prevents the wheel from turning with the spring, each ridge successively compresses the spring 18 and the end of the spring snaps against each ridge successively thereby delivering a succession of blows to the disk shaft and degrading stiction. The motor shaft turns a sufficient number of times to eliminate stiction forces at which instant the driven shaft begins to rotate. The greatest torque that can be exerted by the motor is determined by the pitch of the spring and sliding friction between the spring and the ridges on the wheel.

A second embodiment incorporating a solenoid is illustrated in FIG. 2. There is shown a motor 30 and motor shaft 32 which is also the driven shaft of the driven mechanism (e.g., the disk array). A tube 34 is slideably mounted on the shaft 32 and the tube is also the core of a solenoid 36. When the solenoid 36 is energized by an alternating current, the tube slides back and forth between the spring and a shoulder 40 thereby administering a series of blows to the shoulder. The series of blows are transmitted as a shock wave to the source of stiction.

A circuit for energizing the solenoid and motor in accordance with the invention is also shown in FIG. 2. A power source energizes a constant current source 42 and an oscillator 44. When the power Ep is turned on, a constant current is fed to the motor 30. If the motor shaft can not turn (due, e.g., to stiction), then the voltage across the motor terminals will simply be IR where I is the constant current and R is the resistance of the motor coils.

i.e., $Em = IR$

The motor voltage, Em, is applied to the control terminals of a square wave current source 44 whose output is applied to the solenoid 36. Referring to the graph of FIG. 3, when Em is less than a cutoff value Em', pulses are applied by current source 44 to the solenoid so that the motor shaft is subject to a series of shocks. The stiction force diminishes with each shock until a number, n, of shocks is applied sufficient to reduce the stiction force to a value where the torque from the motor overcomes the stiction and the shaft starts to turn. Em rises according to $Em = IR + \phi s$ where $\phi$ is the motor flux and s is the speed of the motor. When $Em = Em'$ the current to the solenoid is cutoff. This mode of disrupting stiction also incorporates the principles of repeated perturbations to overcome stiction and applying a torque close to the operating value of torque that will not endanger the rotating mechanism.

If greater protection to the rotating mechanism is required, then the version shown in FIG. 2 is further modified by feeding back the motor voltage, Em, to control terminals 33 on the source 42 of motor current so that when the motor voltage Em exceeds the breakaway value Em' shown on the graph, current to the motor is increased to operating value.

A third method of overcoming stiction is illustrated in FIG. 4. This method is an improvement of the method disclosed in U.S. Pat. No. 4,530,021 to Cameron in which an alternating current is applied by current source to the voice coil of the actuator in order to induce micromotion of the head.

In accordance with the present invention and referring to FIG. 4, current is applied from a constant current source 42 to the motor 30 so that the voltage across the motor leads is $Em = IR$ Em is applied to the control terminals of ac current generator 50 which applies ac curent to the voice coil 52 that actuates the head 54.

After an adequate period of micromotion (represented by oscillations on the graph of FIG. 4) the disk will break away from the head and start to turn causing Em to rise to a value Em' at which instant, current from source 50 will cease and micromotion will be interrupted as discussed above.

This version may also feature the means to increase the motor current after the stiction restraint has been removed as shown in FIG. 4. This is accomplished by feeding the motor voltage Em back to control terminals 33 signaling the motor current to increase when the motor voltage exceeds an appropriate value Em'. A pictorial presentation of the "constant voltage" technique is essentially identical to the circuit diagram presented in FIG. 2 except that the constant current souce 42 is change to a constant voltage source.

The three constructions describe three different methods of applying the principle features of the invention which are to apply perturbations to a "frozen" driven mechanism in order to disrupt the "freezing" mechanism, apply moderate force from a driving source to the driven mechanism to test when said perturbations can be interrupted and full driving force applied then increasing the force to operating value.

These examples are intended to be illustrative and are not intended to limit the scope of the claims. Variations of these features that will occur to one having ordinary skill in the art after reading the specification and studying the drawings are also included within the scope of the claims.

I claim:

1. A means for liberating an assembly of at least one disk mounted coaxially on a rotatable disk shaft and at least one head positioned to record on each said disk driven by a motor means having a motor shaft wherein the disks are restrained from rotating by stiction force between said heads and said disks, said means comprising in operative combination:

a means to generate repeated perturbations on said assembly of disks and heads, each perturbation having a magnitude operably selected to diminish said stiction restraint without damaging said head disk assembly;

a means to test said head disk assembly after each said perturbation to determine when said stiction restraint has been reduced to below a value where said motor can turn said disks without damaging said head disk assembly and then to discontinue said perturbations;

a means to apply full operating power to said head disk assembly by said motor means after said perturbations have been discontinued.

2. A liberating means as in claim 1 wherein said means for generating perturbations includes a spring having an end attached to said motor shaft and a second end adjacent to said disk shaft;

a wheel concentrically fixed to said disk shaft and having a surface with radial ridges in contact with said second spring end;

said motor turning said motor shaft and spring causing said spring to slide on and be compressed momentarily by each said ridge then released to strike said neighboring ridge as said second end of said spring slides off said ridge thereby reducing said stiction by repeated perturbations which permits said spring to engage said wheel in nonsliding contact causing said disk to turn with said motor.

3. A liberating means as in claim 2 wherein said motor shaft is coupled to said disk and said means for generating perturbations includes
   a tube slideably mounted between a shoulder and a spring on said disk shaft;
   a solenoid enclosing said tube and having terminals that can be connected to a source of alternating current.

4. A liberating means as in claim 3 wherein said motor has terminals and said means for transmitting further comprises:
   a constant current source that may apply constant current to said motor terminals and impose a voltage between said motor terminals;
   an alternating current source means having output terminals; an electric switch means having terminals connected to said solenoid terminals, said motor terminals and said alternating current source terminals and that sends alternating current to said solenoid terminals from said alternating source when said motor voltage is less than a breakaway value and interrupts said alternating current when said motor voltage is greater than a breakaway value;
   said voltage applied to said control terminals causing said alternating current source to activate said solenoid and said sliding tube to oscillate when said shafts are stationary and said voltage is less than said breakaway value and interrupting said alternating current to said solenoid when said motor shaft turns and said voltage increases to a value greater than said breakaway value.

5. A liberating means as in claim 2 wherein said head is connected to a voice coil actuator, said motor has terminals, and said means for generating perturbations includes
   a means for applying power to said motor terminals and generating a power signal proportional to said power;
   an alternating current source means having output terminals;
   an electric switch means having terminals connected to said output terminals of said alternating current means and to said voice coil and a means for controlling said switch means responsive to said power signal connected to said motor terminals thereby enabling said power signal to cause said switch means to send alternating current from said source of alternating current to said voice coil when said motor power signal is less than a breakaway value and interrupting said alternating current to said voice coil when said motor power signal exceeds a breakaway value.

6. A liberating means as in claim 5 wherein said power applying
   means further comprises means to control power with terminals connected to said motor terminals thereby enabling power from said power applying means to be increased to an operating value when said power signal exceeds said breakaway value.

7. A method for liberating a driven mechanism which comprises at least one disk mounted on a rotatable disk shaft and recording heads positioned to record on said disks, to be driven by a force applied by a driving mechanism including a motor having a motor shaft coupled to said disk shaft wherein said driven mechanism is immobilized by a restraint generated by stiction between said heads and said disks, which includes the steps:
   (a) applying said driving force less than an operating value to said driven mechanism;
   (b) applying a perturbation to said driven mechanism;
   (c) testing after said perturbation to determine if said restraint has been diminished to a breakaway value;
   (d) repeating steps (b) and (c) until said restraint has been reduced to said breakaway value;
   (e) increasing said driving force to an operating value after said stiction restraint has been overcome.

* * * * *